United States Patent [19]

Dickerson

[11] Patent Number: 4,875,386

[45] Date of Patent: Oct. 24, 1989

[54] HANDLEGRIP CRUISE ASSIST DEVICE

[76] Inventor: Daryl E. Dickerson, P.O. Box 1222, Grants Pass, Oreg. 97526

[21] Appl. No.: 361,990

[22] Filed: Jun. 5, 1989

[51] Int. Cl.[4] .......................... B62K 21/12; B62K 21/26
[52] U.S. Cl. .................................. 74/551.9; 74/551.8; 74/488; 16/114 R; 16/DIG. 30; 16/DIG. 40; 16/115
[58] Field of Search ..................... 74/551.3, 551.8, 489, 74/506, 531, 488; 16/114 R, 111 R, 115, DIG. 30, DIG. 40

[56] References Cited

U.S. PATENT DOCUMENTS

| | | | |
|---|---|---|---|
| 1,185,467 | 5/1916 | Beauchamp . | |
| 1,473,326 | 11/1923 | Slawienski . | |
| 3,827,739 | 8/1974 | Overholser | 16/114 R |
| 3,834,249 | 9/1974 | Bothwell | 74/551.8 |
| 3,937,629 | 2/1976 | Hamasaka | 74/551.8 |
| 3,982,446 | 9/1976 | Van Dyken | 74/488 |
| 4,060,008 | 11/1977 | Wilkinson | 74/488 |
| 4,137,793 | 2/1979 | Sowell | 74/488 |
| 4,256,197 | 3/1981 | Kiser | 74/531 X |
| 4,296,643 | 10/1981 | Cornelius | 74/531 |
| 4,364,283 | 12/1982 | Ricardo | 74/489 |
| 4,438,661 | 3/1984 | Cullen | 74/551.9 |
| 4,783,883 | 11/1988 | Szalay | 16/114 R |

FOREIGN PATENT DOCUMENTS

| | | | |
|---|---|---|---|
| 1046146 | 12/1953 | France | 74/551.9 |
| 1221709 | 6/1960 | France | 74/551.9 |
| 25297 | of 1904 | United Kingdom | 74/551.9 |
| 708 | of 1913 | United Kingdom | 74/551.9 |

Primary Examiner—Vinh T. Luong
Attorney, Agent, or Firm—John F. Ingman

[57] ABSTRACT

A handlegrip cruise assist device is formed of a single piece of stiff resilient material, having a circular segment which is shaped circularly so as to grip the outer end of the throttle handlegrip, and a lever segment which extends beneath the heel of the palm and adjoining wrist of the operator with his hand in the normal operating position on the throttle handlegrip. The application of downward pressure on the lever segment from the palm and the adjoining wrist of the throttle hand neutralizes the return force of the carburetor return-to-idle springs, permitting the operator to maintain a constant throttle opening without having to grasp the throttle handlegrip. The circular segment is of a diameter slightly less than the diameter of a complete circle. When mounted, the application of downward pressure on the lever segment of the device contracts the diameter of the circular segment to increase its grip upon the throttle handlegrip and assure that the relative rotational positions of the cruise control device and the throttle handlegrip remain the same. However, when upward pressure is applied to the lever segment, the diameter of the circular segment expands so as to loosen the grasp of the device on the throttle handlegrip, thereby permitting the relative position of the cruise control device and the throttle handlegrip to be rotated for release or adjustment of cruising position.

2 Claims, 1 Drawing Sheet

U.S. Patent
Oct. 24, 1989
4,875,386
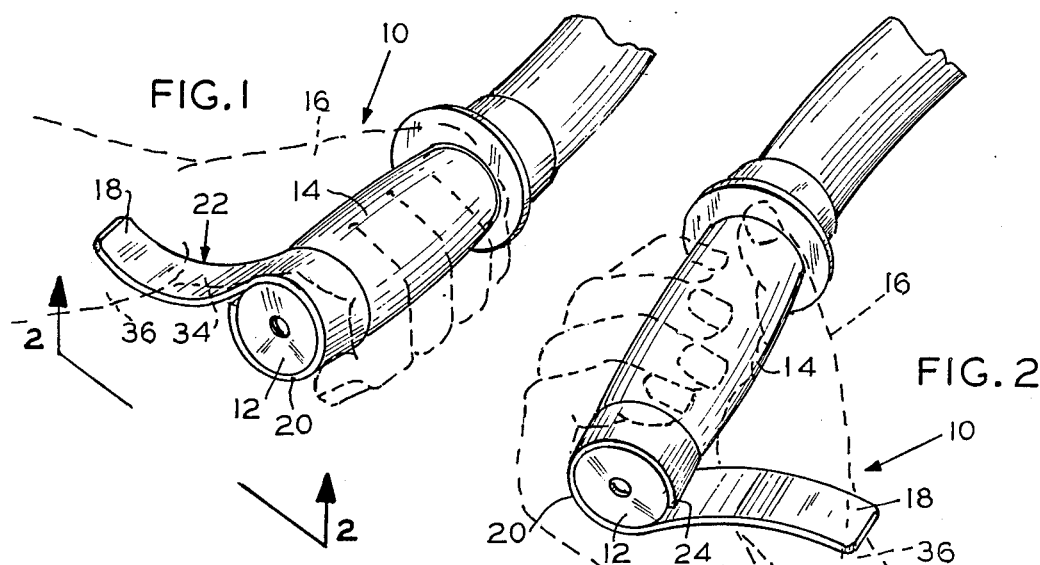
FIG. 1
FIG. 2
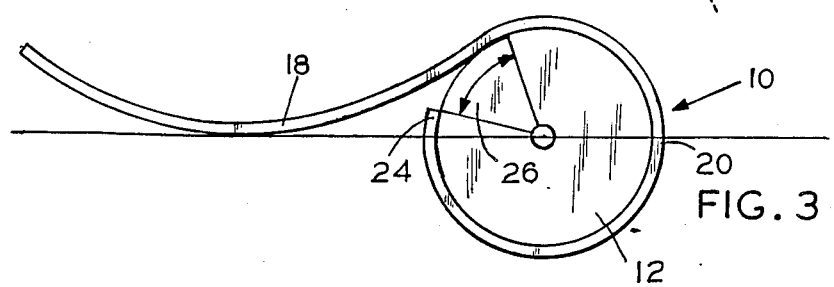
FIG. 3
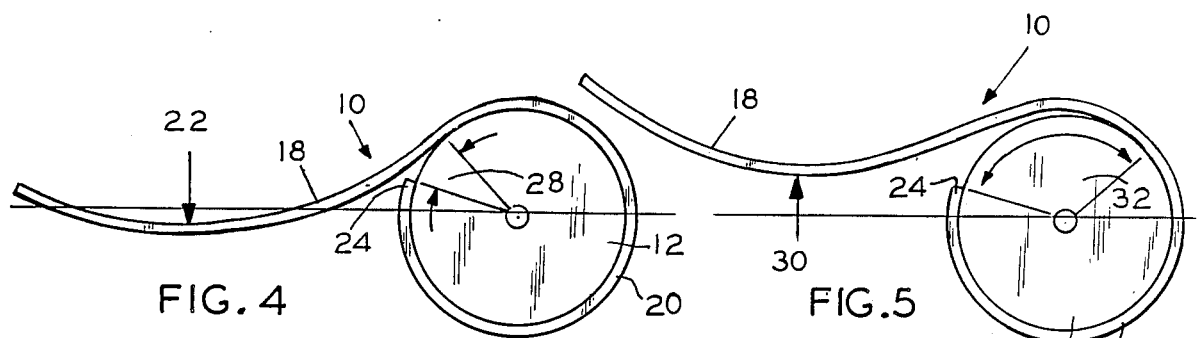
FIG. 4
FIG. 5
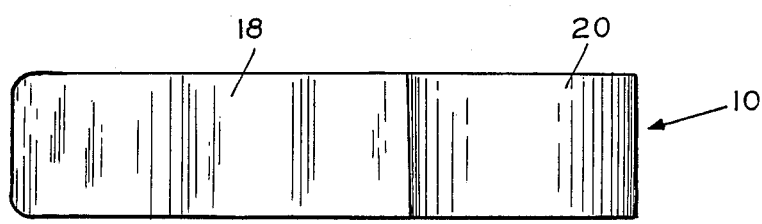
FIG. 6

HANDLEGRIP CRUISE ASSIST DEVICE

BACKGROUND OF THE INVENTION

1. Field of the Invention

The present invention generally relates to throttle control devices for motorcycles which prevent throttle hand and wrist fatigue for motorcycle operators, and more particularly, is concerned with a lever-type device, releasably attachable to, and rotatingly adjustable upon, the existing throttle handlegrip, which permits the motorcycle operator to maintain a constant throttle setting by pressure from the palm of his hand and the adjoining wrist.

2. Description of the Prior Art

On the conventional motorcycle, the rotation of the throttle handlegrip operates to change the throttle setting at the carburetor. When the throttle handlegrip is released, springs at the carburetor forceably close the carburetor throttle to an idle position with concurrent rotation of the throttle handlegrip. It is against such spring-biased rotational force that the motorcycle operator must grip and rotate the throttle handlegrip in order to achieve and maintain the desired throttle opening.

On long trips, especially where a constant throttle opening is desired to maintain a cruising speed, the necessity to firmly grip the throttle handlegrip and rotate it against the return-to-idle spring force creates a condition of fatigue in the hand and wrist of the operator. In such position, from the constant gripping force exerted, in combination with inherent vibration, the operator's hand has been known to go to sleep, creating a potentially hazardous situation.

A number of cruise control devices have been developed which mechanically lock the rotating throttle handlegrip to a certain set position, with a means for releasing the lock so that the throttle can once again be adjusted or return to an idle position. Such physical locking of the throttle handlegrip in a preselected position is inherently unsafe; as the motorcycle operator of ordinary skill is aware, the unexpected occurs quickly, and the time that it takes to release a lock or overcome a resistance may be all-important. Furthermore, such cruise control devices may be complex, involve replacement or modification of the throttle handlegrip, and require tools for installation when cruise control is desired, as for open-road operation, and for removal when not desired, as for city driving.

What is needed is a handlegrip cruise assist device which:

a. allows the motorcycle operator to maintain, without a gripping and twisting effort, a steady throttle position for extended periods of time without discomfort;

b. utilizes the existing throttle configuration, including the same throttle handlegrip and return-to-idle feature, without modification;

c. is easily and quickly installable and removable without tools;

d. is readily adjustable and releasable to permit the throttle position desired; and e. is simple, durable, and inexpensive.

SUMMARY OF THE INVENTION

The present invention provides a handlegrip cruise assist device designed to satisfy the aforementioned needs. The invention embodies a lever-type device which releasably attaches to the existing rotating throttle handlegrip, and is rotatingly adjustable, so as to permit the motorcycle operator to maintain a desired constant throttle setting only by pressure from the heel of the palm of his hand and the adjoining wrist area.

Accordingly, the present invention involves a handlegrip cruise assist device, formed of a single piece of stiff resilient material, having a circular segment which is shaped circularly so as to grip the outer end of the throttle handlegrip, and a lever segment which extends beneath the heel of the palm and adjoining wrist of the operator with his hand in the normal operating position on the throttle handlegrip. The simple application of downward pressure on the lever segment from the palm and the adjoining wrist of the throttle hand neutralizes the return force of the carburetor return-to-idle springs, permitting the operator to maintain a constant throttle opening without having to grasp the throttle handlegrip.

The circular segment is of an inside diameter slightly less than the diameter of the throttle handlegrip, and is formed to terminate short of a complete circle. The device is installable on the outer end of the throttle handlegrip by simple radial expansion of the circular segment. The resiliency of the circular segment of the device maintains its position, when mounted, on the throttle handlegrip.

The cruise assist device is formed so that, when mounted, the application of downward pressure on the lever segment of the device contracts the diameter of the circular segment to increase its grip upon the throttle handlegrip and assure that the relative rotational position of the cruise control device and the throttle handlegrip remains the same. However, when upward pressure is applied to the lever segment, the diameter of the circular segment expands so as to loosen the grasp of the device on the throttle handlegrip, thereby permitting the relative position of the cruise control device and the throttle handlegrip to be rotated for release or adjustment of cruising position.

BRIEF DESCRIPTION OF THE DRAWINGS

FIG. 1 is a perspective view of the handlegrip cruise assist device, mounted on a throttle handlegrip, with the operator's hand superimposed thereon is dashed lines.

FIG. 2 illustrates the handlegrip cruise assist device, as seen from beneath at line 2—2 of FIG. 1, showing the position of the lever segment across the heel of the palm of the operator's hand and adjoining wrist area.

FIG. 3 illustrates a side view of the handlegrip cruise assist device, as mounted on a throttle handlegrip.

FIG. 4 illustrates the side view of the handlegrip cruise assist device of FIG. 3, comparatively showing the tightening effect of external downward pressure on the lever segment.

FIG. 5 illustrates the side view of the handlegrip cruise assist device of FIG. 3, comparatively showing the loosening effect of upward pressure on the lever segment, so as to permit rotation and adjustment of the position of the device on the throttle handlegrip.

FIG. 6 illustrates a bottom view of the handlegrip cruise assist device.

DESCRIPTION OF THE PREFERRED EMBODIMENT

Referring now to the drawings of FIG. 1 and FIG. 2, there is shown the preferred embodiment of the handlegrip cruise assist device 10, which is attached adjacent to the outer end 12 of a motorcycle right hand throttle handlegrip 14. An operator's hand 16 is shown in phantom. As is conventional, the throttle handlegrip 14 has an inherent clockwise bias, with such clockwise rotation, as viewed from the end 12, corresponding to reducing the carburetor throttle opening, the position of maximum clockwise rotation being a throttle opening so that the engine is at idle.

The handlegrip cruise assist device 10 in the preferred embodiment is manufactured from a stiff, resilient material, such as an extruded acrylic plastic. The device 10 is formed of two segments, a lever segment 18 and a circular segment 20, as best seen in FIG. 3. The circular segment 20 terminates before its end 24 closes to a complete circle with the lever segment 18; and has a preferred inside diameter of approximately 1¼-inches, slightly less than the diameter of the outer end 12 most common to throttle handle grips 14. To install the handlegrip cruise assist device 10, the circular segment 20 is radially spread and placed over the outer end 12 of the throttle handlegrip 14. The resilient nature of the material causes the circular segment 20 to close about the outer end 12 of the throttle handlegrip 14 so as grip it firmly. As seen in FIG. 4, external downward pressure 22, applied on the cruise assist lever segment 18, will rotate the handlegrip 14 in a counter-clockwise direction, in opposition to the designed bias in the clockwise direction towards idle speed. Importantly, the external downward pressure 22 on the lever segment 18, in a counter-clockwise rotation, also will tend to cause the lever 18 to more closely approach the end 24 of the circular segment 20, as seen by gap angle 26, without pressure in FIG. 3, decreasing to gap angle 28 in FIG. 4 with downward pressure 22 applied. This causes the circular segment 20 to be reduced in diameter, thereby further tightening its grip effectively on the end 12 of the throttle handlegrip 14 to further prevent the device's circular segment 20 from slipping on the end 12 of the throttle handlegrip 14 when such pressure 22 is applied. Conversely, as seen in FIG. 5, upward (clockwise) pressure 30 will cause the lever segment 18 to become more separated from the end 24 of the circular segment 20, as seen at gap angle 32, thereby expanding the diameter of the circular segment 20 and loosening its grip on the throttle handlegrip end 12. The ability to loosen the attachment of the handlegrip cruise assist device 10 by simple upwards pressure 30, as by movement of the hand 16 against the lever segment 18, makes adjustment of the angular location of the cruise assist device 10 on the throttle handlegrip 14 a simple operation, the device 10 then being rotated clockwise to the desired new position, either to set a new cruising speed or to rotate the device 10 out of the way, as for city driving where cruise control is inappropriate.

In operation, the lever segment 18 of the device 10 extends inwardly, under the palm heel 34 of the throttle hand 16 and the adjoining wrist area 36, as shown in phantom in FIG. 1 and FIG. 2. The handlegrip cruise assist device 10 is adjusted, as described above, on the throttle handlegrip end 12 so that it extends essentially parallel to the roadway at the throttle position which gives the speed desired by the operator. This permits the operator, with the palm heel 34 and the adjoining wrist 36 resting on the lever segment 18 of the device 10, to maintain a constant speed, the downward pressure 22 neutralizing the tendency of the throttle handlegrip 14 to return clockwise to idle speed. Of course, individual preference may change the relative position of the lever segment 18 for maximum comfort.

The drawings illustrate the preferred embodiment, wherein the lever segment 18 is curved or contoured so as to better fit the shape of the operator's palm heel 34 and wrist 36. The curvature selected as preferred is an arc with a three-inch radius. A straight lever (not shown) rather than the preferred curved lever 18 also works excellently, this shape possibly being preferred by some operators.

The motorcycle operator, while maintaining pressure on the lever segment 18 of the device 10 with the palm heel 34 and adjoining wrist area 36 is able to rest his grip and wrist, which otherwise would be required to be stressed in order to maintain a constant throttle opening. The handlegrip cruise assist device 10 utilizes the existing throttle configuration, including the same throttle handlegrip 14 and return-to-idle feature, without modification, and is easily and quickly installable and removable without tools. It is uniquely adjustable and releasable to permit the throttle position desired, and is extremely simple, durable, and inexpensive.

While the above description has been couched in terms of the operation of a motorcycle, clearly the scope of the invention extends to any motorcycle-like throttle control, such as may be found, for example, on snowmobiles or all-terrain vehicles.

It is thought that the handlegrip cruise assist device of the present invention and its many attendant advantages will be understood from the foregoing description and that it will be apparent that various changes may be made in form, construction and arrangement of the parts thereof without departing from the spirit and scope of the invention or sacrificing all of its material advantages, the form hereinbefore described being merely an exemplary embodiment thereof.

I claim:

1. A handlegrip cruise assist device, in combination with a rotatable throttle handlegrip having a return-to-idle bias, as found on motorcycles and the like, the handlegrip cruise assist device comprising:
    an elongated, stiff, resilient member having a lever segment and a circular segment, which are formed as a single piece;
    the circular segment being formed into a circular shape having a slightly smaller diameter than an outer end of the throttle handlegrip and which terminates before the circular shape closes, with a variable gap remaining, so that downward pressure on the lever segment reduces the gap and the diameter of the circular segment thereby tightening the encircling grip and upward pressure on the lever segment increases the gap and diameter of the circular segment thereby loosening the encircling grip to readily permit rotation of the cruise assist device with respect to the the handlegrip for rapid and simple adjustment of the position of the device on the throttle handlegrip;
    the lever segment extending from the circular segment and tangentially from the throttle handlegrip towards the operator;
    wherein downward pressure from the palm heel of the operator's hand and adjoining wrist area against the lever segment serves to overcome said return-to-idle bias and thus maintain the position of the rotatable throttle handlegrip at the desired throttle setting.

2. A handlegrip cruise assist device, as recited in claim 1, wherein said lever segment of the device is contoured to fit the palm heel and adjoining wrist of the operator's hand.

* * * * *